United States Patent [19]
Tanaka et al.

[11] Patent Number: 6,151,090
[45] Date of Patent: *Nov. 21, 2000

[54] LCD USING LIQUID CRYSTAL OF FERROELECTRIC AND/OR ANTIFERROELECTRIC PHASE HAVING PRETILT ANGLE OF 1 DEGREE OR LESS

[75] Inventors: Tomio Tanaka, Hachioji; Jun Ogura, Fussa; Tetsushi Yoshida, Kanagawa-ken, all of Japan

[73] Assignee: Casio Computer Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/672,380

[22] Filed: May 28, 1996

[30] Foreign Application Priority Data

May 31, 1995 [JP] Japan ................................... 7-157066
May 31, 1995 [JP] Japan ................................... 7-157071
May 31, 1995 [JP] Japan ................................... 7-157217
May 31, 1995 [JP] Japan ................................... 7-157221

[51] Int. Cl.$^7$ .......................... G02F 1/1337; G02F 1/141; G02F 1/13
[52] U.S. Cl. ......................... 349/134; 349/124; 349/125; 349/129; 349/174
[58] Field of Search ................................... 349/129, 134, 349/125, 126, 133, 174

[56] References Cited

U.S. PATENT DOCUMENTS

| | | | |
|---|---|---|---|
| 5,172,255 | 12/1992 | Brosig et al. | 349/126 |
| 5,198,917 | 3/1993 | Togashi | 349/126 |
| 5,364,560 | 11/1994 | Mizukami et al. | 349/174 |
| 5,378,392 | 1/1995 | Murashiro et al. | 349/174 |
| 5,589,966 | 12/1996 | Hama et al. | 349/196 |
| 5,633,740 | 5/1997 | Asaoka et al. | 349/129 |
| 5,686,019 | 11/1997 | Nakamura | 349/123 |
| 5,739,884 | 4/1998 | Nishi et al. | 349/134 |

FOREIGN PATENT DOCUMENTS

| | | |
|---|---|---|
| 62-111237 | 5/1987 | Japan . |
| 63-151926 | 6/1988 | Japan . |
| 64-55257 | 2/1989 | Japan . |
| 2-153322 | 6/1990 | Japan . |
| 2-222930 | 9/1990 | Japan . |
| 3-89319 | 4/1991 | Japan . |
| 4-29119 | 4/1991 | Japan . |
| 4-57020 | 2/1992 | Japan . |
| 5-273554 | 10/1993 | Japan . |
| 95-12119 | 5/1995 | Japan . |
| 7-152036 | 6/1995 | Japan . |
| 7-218917 | 8/1995 | Japan . |
| 7-325304 | 12/1995 | Japan . |

Primary Examiner—William L. Sikes
Assistant Examiner—Toan Ton
Attorney, Agent, or Firm—Frishauf, Holtz, Goodman, Langer & Chick, P.C.

[57] ABSTRACT

A liquid crystal cell is formed by bonding a first substrate on which a first electrode and a first aligning film are formed, and a second substrate on which a second electrode and a second aligning film are formed by a seal member. A liquid crystal is filled in the liquid crystal cell. The thicknesses of the aligning films are set to 10 nm to 35 nm. An aligning treatment is performed twice on each of the aligning films in the opposite directions. The first aligning treatment is performed to give a pretilt angle of 5 degrees to the liquid crystal, and the second aligning treatment is performed to give a pretilt angle of 6 degrees to the liquid crystal, with the result that a pretilt angle of 1 degree is actually given to the liquid crystal. The glass-transition temperatures of the aligning films are selected to be about 250° C., so that the aligning films are not transformed at the time of baking the seal member.

10 Claims, 13 Drawing Sheets

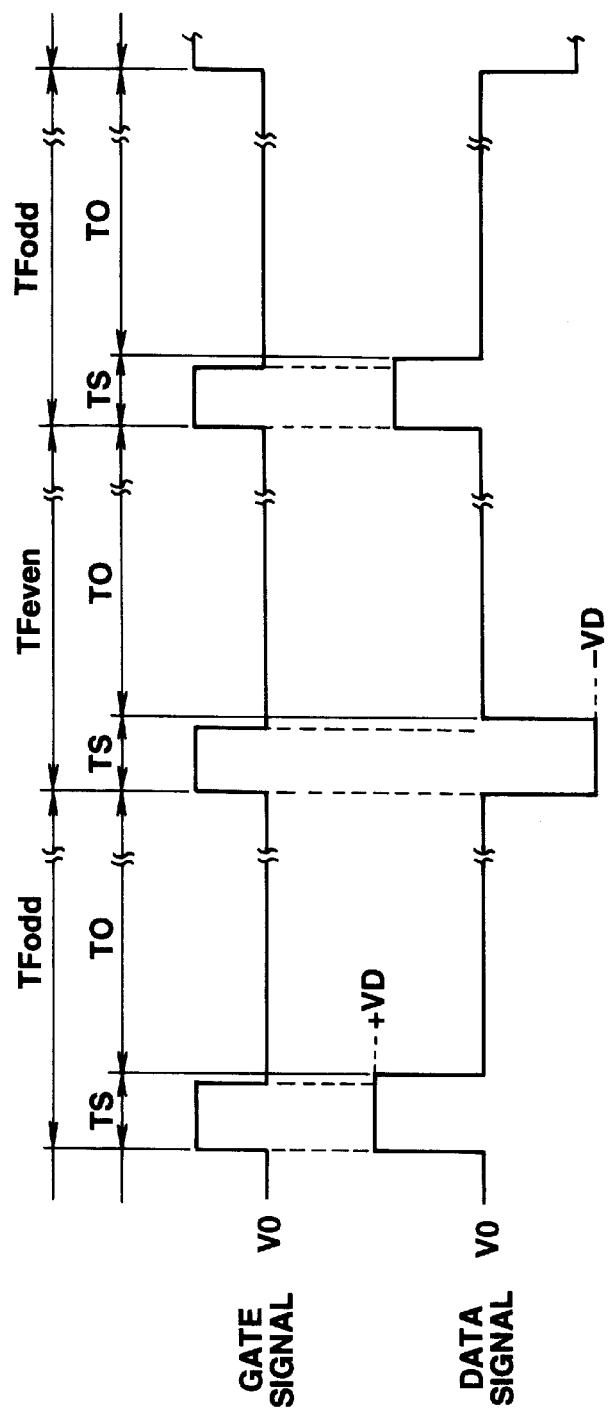

FIG.14A  PRETILT ANGLE 10°
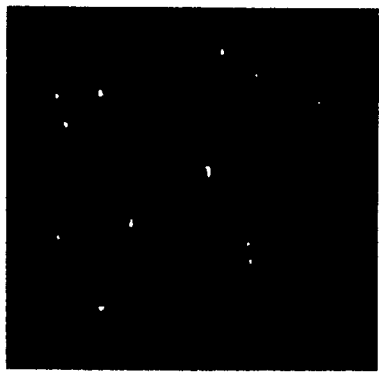
FIG.14B  PRETILT ANGLE 0.8°

SURFACE ENERGY
8dyne/cm

SURFACE ENERGY
4dyne/cm

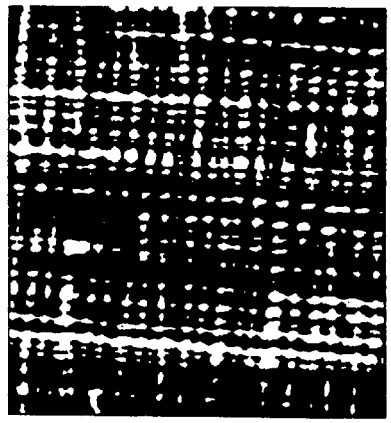
FIG.19A  GLASS-TRANSITION POINT OF ALIGNING FILM 200°C
FIG.19B  GLASS-TRANSITION POINT OF ALIGNING FILM 250°C

LCD USING LIQUID CRYSTAL OF FERROELECTRIC AND/OR ANTIFERROELECTRIC PHASE HAVING PRETILT ANGLE OF 1 DEGREE OR LESS

BACKGROUND OF THE INVENTION

1. Field of the Invention

The present invention relates to a liquid crystal display (LCD) device using a liquid crystal having a ferroelectric phase and/or an antiferroelectric phase.

This invention also relates to an LCD device that uses a liquid crystal having a ferroelectric phase and/or an antiferroelectric phase, which can provide a stable alignment state with less alignment defects.

2. Description of the Related Art

It has been proposed to use a ferroelectric liquid crystal whose chiral smectic phase has a helical pitch smaller than the gap between substrates of a display device as a ferroelectric LCD device which can ensure gradation display. Ferroelectric liquid crystals of this type are classified into an SBF liquid crystal which has a memory property and a DHF liquid crystal which has no memory property (see "LIQUID CRYSTALS," 1989, Vol. 5, No. 4, pages 1171 to 1177).

The DHF liquid crystal is sealed between substrates, with the helical structure remaining intact. When a voltage whose absolute value is sufficiently large is applied between electrodes facing each other with a liquid crystal layer in between, the DHF liquid crystal becomes either a first alignment state (first ferroelectric phase) in which the average direction of the directors of the liquid crystal (LC) molecules is aligned to a first aligning direction or a second alignment state (second ferroelectric phase) in which the average direction of the directors of the LC molecules is aligned to a second aligning direction, in accordance with the polarity of the applied voltage. When the absolute value of the applied voltage is lower than the one which sets the DHF liquid crystal to the first alignment state or the second alignment state, the DHF liquid crystal becomes an intermediate alignment state in which the average direction of the directors of the LC molecules comes between the first and second aligning directions, due to the helical deformation of the molecule alignment. The intermediate gradation can be displayed using this intermediate alignment state.

In an LCD device using an SBF liquid crystal, the ratio of the area which has the LC molecules in the first alignment state to the area which has the LC molecules in the second alignment state varies in accordance with the applied voltage. The intermediate gradation can be displayed using a variation in this ratio.

A recent development is the use of the antiferroelectric liquid crystal. The antiferroelectric liquid crystal has three stable states of two ferroelectric phases and one ferroelectric phase, and is also aligned in the intermediate alignment state by the precursor or the like. The intermediate gradation can be displayed using this intermediate alignment state.

According to an LCD device which uses a liquid crystal having a ferroelectric phase and/or an antiferroelectric phase, the angle (tilt angle) $\Theta_1$ of the LC molecules with respect to the direction of the normal line of a smectic layer when a predetermined positive voltage shown in FIG. 1A is applied should desirably be directed in the opposite direction to the direction of the tilt angle $\Theta_2$ of the LC molecules when a predetermined negative voltage shown in FIG. 1B is applied, and have the same value as that of the tilt angle $\Theta_2$. In other words, it is desirable that the applied voltage vs. transmittance characteristics for the application of voltages of the opposite polarities should be equal to each other.

Actually, the tilt angles $\Theta_1$ and $\Theta_2$ of the ferroelectric liquid crystal when the same voltages of the opposite polarities are applied differ from each other. The transmittance of the LCD device therefore varies in accordance with polarity of the applied voltage, resulting in irregular images in accordance with the display gradation or unstable display.

An LCD device which uses a liquid crystal having a ferroelectric phase uses an aligning film with a high pretilt angle to prevent the liquid crystal from having the chevron structure. To stabilize the alignment, a relatively thick aligning film is used.

The aligning film with a high pretilt angle is apt to cause an alignment defect, degrading the display quality. In addition, the thickness reduces the voltage to be applied to the liquid crystal and increases the drive voltage, thus increasing the consumed power.

Further, the process for bonding two substrates at the time of forming an LCD device bonds both substrates by an unhardened seal member which is baked at a high temperature of about 200° C. This high-temperature treatment degrades the characteristics of the previously formed aligning film, which may cause an alignment defect on the completed LCD device. A similar problem occurs at the time of sealing the LC injecting inlet, formed in the seal member, by a thermosetting resin.

In an LCD device which uses a liquid crystal having a smectic phase such as a ferroelectric liquid crystal and an antiferroelectric liquid crystal, the liquid crystal is located between the substrates with a layer structure and is aligned in such a way that the normal direction of the layer is directed in accordance with the direction of an aligning treatment. When the characteristics of the aligning film is degraded by the heat treatment in the manufacturing process as mentioned above, however, the alignment itself becomes difficult. Further, a defect in one layer spreads to another layer. The heat-originated deterioration of the aligning film therefore is prominent in LCD devices which use a liquid crystal having a smectic phase such as a ferroelectric liquid crystal and an antiferroelectric liquid crystal.

SUMMARY OF THE INVENTION

Accordingly, it is an object of the present invention to provide an LCD apparatus, which uses a liquid crystal having a ferroelectric phase and/or an antiferroelectric phase and which can accomplish stable gradation display.

It is another object of this invention to provide an LCD device which can ensure stable alignment with less alignment defects.

It is a further object of this invention to provide an LCD device which uses a liquid crystal having a ferroelectric phase and/or an antiferroelectric phase and which can operate on a low drive voltage.

To achieve the above objects, an LCD device according to the first aspect of this invention comprises:

a first substrate on which a first electrode is formed;

a second substrate on which a second electrode facing the first electrode is formed;

an aligning film, formed on the first substrate and the first electrode and having undergone a first aligning treatment in a first direction and a second aligning treatment in a second direction opposite to the first direction following the first aligning treatment; and a liquid crystal having a smectic phase located between the aligning film and the second substrate.

According to the LCD device with the above-described structure, aligning treatments are performed on the aligning film several times in the opposite directions. Such treatments make the tilt angles of the LC molecules with respect to the applied voltages of different polarities become equal to each other. Therefore, substantially the same display characteristics can be obtained by the positive applied voltage and the negative applied voltage.

An LCD device according to the second aspect of this invention comprises:

a first substrate on which a first electrode is formed;

a second substrate on which a second electrode facing the first electrode is formed;

a liquid crystal, located between the first and second substrates and having a layer structure with a smectic phase, the liquid crystal having a first alignment state in which LC molecules are substantially aligned in a first aligning direction, a second alignment state in which the LC molecules are substantially aligned in a second aligning direction and an intermediate state in which an average direction of directors of the LC molecules is aligned in an arbitrary direction between the first aligning direction and the second aligning direction;

an aligning film, formed on the first substrate and the first electrode, for giving a substantially same elastic coefficient to LC molecules which tilt rightward with respect to a normal line of a layer of the layer structure of the liquid crystal and LC molecules which tilt leftward with respect to the normal line and giving a substantially same tilt angle to the LC molecules when voltages of a same value but of opposite polarities are applied to the liquid crystal; and first and second polarization plates, so arranged as to sandwich the first and second substrates, the first polarization plate having an optical axis set in a direction substantially parallel to the normal line of the layer of the layer structure of the liquid crystal, the second polarization plate having an optical axis set perpendicular or parallel to the optical axis of the first polarization plate.

According to the LCD device with such a structure, the aligning film gives substantially the same tilt angle to the LC molecules when voltages with the same value but of the opposite polarities are applied to the liquid crystal. Even if the applied voltages have differential polarities, the tilt angles of the LC molecules become the same when the values of the applied voltages are equal to each other. It is therefore possible to acquire the same display characteristics by the positive applied voltage and the negative applied voltage.

An LCD device according to the third aspect of this invention comprises:

a first substrate on which a first electrode is formed;

a second substrate on which a second electrode facing the first electrode is formed;

a liquid crystal sealed between the first and second substrates and having a smectic phase; and an aligning film, formed on at least one of opposing surfaces of the first substrate and the second substrate, for giving a pretilt angle of 1 degree or a smaller degree to the liquid crystal.

The LCD device with this structure can ensure the stable alignment of the liquid crystal and suffers less alignment defects. In general, the aligning film with a small aligning pretilt angle has a large surface energy or large interaction of the LC molecules. When the surface energy of the aligning film is high, however, the stable alignment cannot be acquired, which may cause alignment defects. An aligning film with a small surface energy and a small pretilt angle can be formed by executing aligning treatments on the aligning film in the opposite directions several times, same as the first aspect of this invention, for example.

An LCD device according to the fourth aspect of this invention comprises:

a first substrate on which a first electrode is formed;

a second substrate on which a second electrode facing the first electrode is formed;

an aligning film, formed on at least one of opposing surfaces of the first substrate and the second substrate and having a thickness of 70 nm or thinner; and a liquid crystal sealed between the first and second substrates and having a smectic phase having at least a ferroelectric phase.

According to this structure, the aligning film is formed only on one substrate. The liquid crystal having a ferroelectric phase has a layer structure with a smectic phase, so that the LC molecules can be aligned even if the aligning film is located only on one substrate. This design simplifies the structure of the device and facilitates the manufacturing process. Because the thickness of the aligning film is set equal to or smaller than 70 nm, the LCD device can be driven on a low voltage. Setting the thickness of the aligning film equal to or greater than 10 nm can suppress the surface energy on the aligning film, thus yielding less alignment defects.

An LCD device according to the fifth aspect of this invention comprises:

a first substrate on which a first electrode is formed;

a second substrate on which a second electrode facing the first electrode is formed;

aligning films, formed on opposing surfaces of the first substrate and the second substrate and having a thickness of 35 nm or thinner; and a liquid crystal sealed between the first and second substrates and having a smectic phase having at least a ferroelectric phase.

According to this structure, because the thicknesses of the aligning films formed on the opposing substrates are set equal to or smaller than 35 nm, the LCD device can be driven on a low voltage. Setting the thickness of the aligning film equal to or greater than 10 nm can suppress the surface energy on the aligning film, thus yielding less alignment defects.

An LCD device according to the sixth aspect of this invention comprises:

a first substrate on which a first electrode is formed;

a second substrate on which a second electrode facing the first electrode is formed;

a seal member, formed by baking, for sealing space between the first and second substrates;

aligning films, formed on at least one of opposing surfaces of the first substrate and the second substrate, the aligning films being formed of a material whose glass-transition temperature is higher than a baking temperature of the seal member; and a liquid crystal located in an area defined by the first and second substrates and the seal member.

The aligning film made of an organic material is formed by stretching the surface of the film of the organic material by rubbing and providing that surface with an anisotropic property. If the aligning film after completed is heated, the drawing axis shifts due to the movement of the principal chain in the aligning film or the like, thus causing improper alignment. According to the LCD device of this invention, the glass-transition temperature of the aligning film is set higher than the baking temperature of the seal member. Even if a heat treatment such as baking is performed in the process of manufacturing the LCD device, therefore, the deterioration of the aligning film (the shifting of the drawing axis) or the like can be prevented. The liquid crystal is thus stably aligned with less alignment defects regardless of the heat treatment in the manufacturing process.

BRIEF DESCRIPTION OF THE DRAWINGS

FIGS. 1A and 1B are diagrams illustrating the relationships between applied voltages and the alignment of LC molecules, FIG. 1A showing the alignment of the LC molecules when a positive voltage is applied while FIG. 1B shows the alignment of the LC molecules when a negative voltage is applied;

FIGS. 7A and 7B are waveform diagrams for explaining one example of a method of driving the LCD device according to the first embodiment, FIG. 7A showing the waveform of a gate signal while FIG. 7B shows the waveform of a data signal;

FIGS. 14A and 14B are diagrams used to explain the relationship between the pretilt angle and the alignment state of the liquid crystal, FIG. 14A showing the occurrence of an alignment defect when the pretilt angle is 10 degrees while FIG. 14B shows the occurrence of an alignment defect when the pretilt angle is 0.8 degree;

FIGS. 15A and 15B are diagrams for explaining the relationship between the surface energy of the aligning film and the alignment state of the liquid crystal, FIG. 15A showing the occurrence of an alignment defect when the aligning film with a large surface energy is used while FIG. 15B shows the occurrence of an alignment defect when the aligning film with a small surface energy is used;

FIG. 19A is a diagram showing the occurrence of an alignment defect of an AFLC (AntiFerroelectric Liquid Crystal) when the aligning film is formed of polyimide whose glass-transition point is 200° C., and FIG. 19B is a diagram showing the occurrence of an alignment defect of an AFLC when the aligning film is formed of polyimide whose glass-transition point is 250° C.

DETAILED DESCRIPTION OF THE PREFERRED EMBODIMENTS

Preferred embodiments of the present invention will now be described with reference to the accompanying drawings.

First Embodiment

Figure 2:
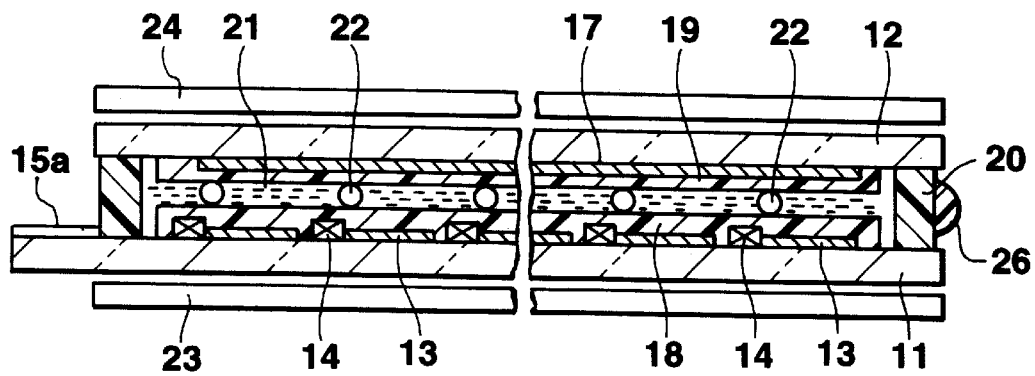
FIG. 2 is a cross-sectional view showing the structure of an LCD device according to the first embodiment of this invention.

An LCD device according to the first embodiment is of an active matrix type, and has a pair of transparent substrates (e.g., glass substrates) 11 and 12. In FIG. 2, transparent pixel electrodes 13, and active elements 14 connected to the pixel electrodes 13 are arranged on the lower transparent substrate (hereinafter called lower substrate) 11 in a matrix form.

The active elements 14 are constituted of, for example, thin film transistors (hereinafter referred to as "TFTs"). Each TFT 14 comprises a gate electrode formed on the lower substrate 11, a gate insulating film covering the gate electrode, a semiconductor layer formed on the gate insulating film, a source electrode formed on the semiconductor layer, and a drain electrode.

Figure 3:
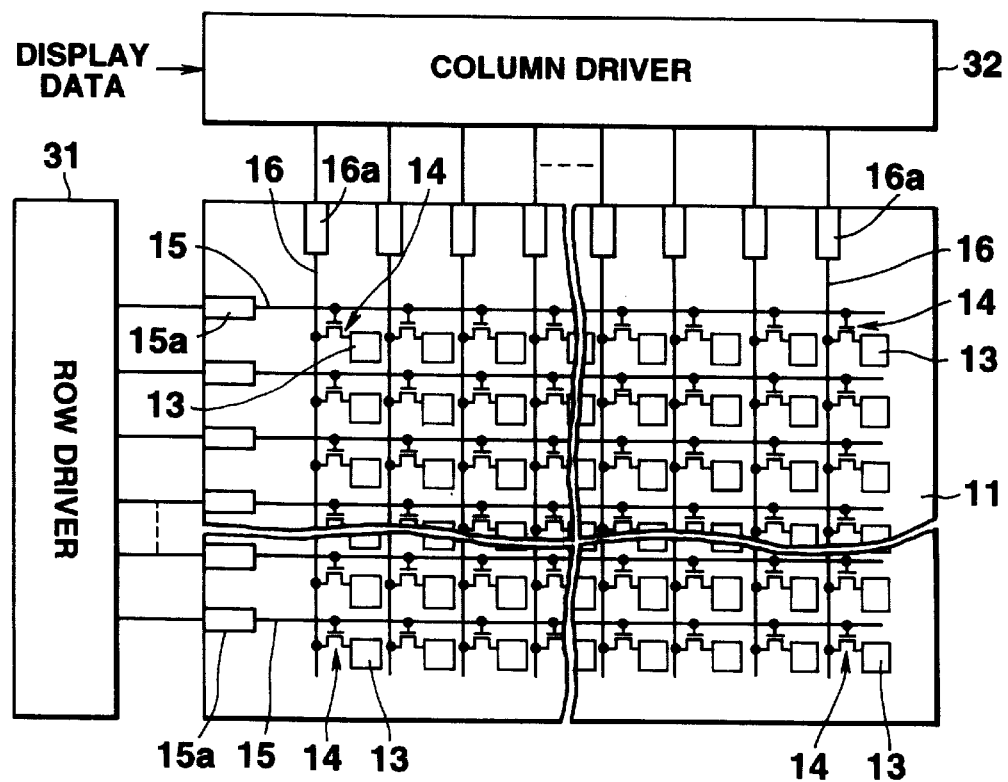
FIG. 3 is a plan view showing the structure of a lower substrate of the LCD device shown in FIG. 2.

As shown in FIG. 3, gate lines (scan lines) 15 are laid between the rows of pixel electrodes 13 and data lines (gradation signal lines) 16 are laid between the columns of pixel electrodes 13 on the lower substrate 11. The gate electrodes of the individual TFTs 14 are connected to the associated gate lines 15, and the drain electrodes of the TFTs 14 are connected to the associated data lines 16.

The gate lines 15 are connected via end portions 15a to a row driver 31, and the data lines 16 are connected via end portions 16a to a column driver 32. The row driver 31 applies a gate pulse (which will be described later) to the gate lines 15 to scan the gate lines 15. The column driver 32 applies a data signal corresponding to display data to the data lines 16 upon reception of the display data (gradation data).

The gate lines 15 are covered by a gate insulating film (transparent film) of the TFTs 14 excluding the end portions 15a, and the data lines 16 are formed on this gate insulating film. The pixel electrodes 13 are formed on the gate insulating film and are connected at their one end portions to the source electrodes of the associated TFTs 14.

In FIG. 2, a transparent opposing electrode 17, which opposes the individual pixel electrodes 13 of the lower substrate 11, is formed on the upper transparent substrate (hereinafter called upper substrate) 12. The opposing electrode 17 is constituted of a single electrode whose area covers the entire display area, and is applied with a reference voltage V0.

Aligning films 18 and 19 are provided on the electrode-forming surfaces of the lower substrate 11 and the upper substrate 12. The aligning films 18 and 19 are homogeneous aligning films formed of an organic high molecular compound, such as polyimide. The surface of the aligning film 18 is subjected to an aligning treatment in a direction 21D indicated by the broken line in FIG. 4. Subsequently, the same surface undergoes rubbing in a direction 21C (indicated by the solid line in FIG. 4) opposite to the direction 21D. That is, two aligning treatments are performed in the opposite directions. The other aligning film 19 has not undergone any aligning treatment. The aligning film 19 may be a protective film or the like. Alternatively, the structure may be modified so that the aligning film 19 is omitted and the opposing electrode 17 directly contacts the liquid crystal 21.

The lower substrate 11 and the upper substrate 12 are adhered at their peripheral edge portions via a frame-shaped seal member 20, thus forming a liquid crystal cell. Formed in the seal member 20 is a liquid crystal inlet through which the liquid crystal 21 is sealed in the LC cell using vacuum injection or the like. The liquid crystal inlet (25 in FIG. 18) is sealed by a sealing agent 26.

The liquid crystal 21 is a ferroelectric liquid crystal whose helical pitch in a chiral smectic C phase is smaller than the distance between both substrates 11 and 12 and which does not memorize the alignment state (DHF liquid crystal). The liquid crystal 21 is made of a ferroelectric liquid crystal substance whose helical pitch (e.g., 400 nm to 300 nm) is equal to or smaller than a range of 700 nm to 400 nm that is the wavelength of a visible light band, and which has large spontaneous polarization and a cone angle of about 27 degrees to 45 degrees. The layer thickness of the liquid crystal 21, i.e., the gap length is kept uniform by a gap member 22.

The liquid crystal 21 forms a uniform layer structure in such a way that the normal line of the layer of the layer structure in the chiral smectic C phase is directed toward the direction 21C of the aligning treatment of the aligning film 18. It is to be noted that the direction of the normal line of the layer of the layer structure does not completely coincide with the direction 21C of the aligning treatment.

Since the helical pitch of the liquid crystal 21 is smaller than the distance between both substrates 11 and 12, the liquid crystal 21 is sealed between the substrates 11 and 12, with the helical structure remaining intact. When a voltage whose absolute value is sufficiently large is applied between the pixel electrodes 13 and the opposing electrode 17, the liquid crystal 21 is set to either a first alignment state in which the aligning directions of most of the LC molecules become equal to a first aligning direction 21A in FIG. 4 or a second alignment state in which the aligning directions of most of the LC molecules assumes a second aligning direction 21B in FIG. 4, in accordance with the polarity of the applied voltage. When a voltage whose absolute value is lower than the voltage which sets the LC molecules to the first alignment state or the second alignment state is applied between the pixel electrodes 13 and the opposing electrode 17, helical deformation occurs in the molecule alignment of the liquid crystal 21 and the liquid crystal 21 assumes an intermediate alignment state in which the average direction of the LC molecules is between the first aligning direction 21A and the second aligning direction 21B.

Figure 4:
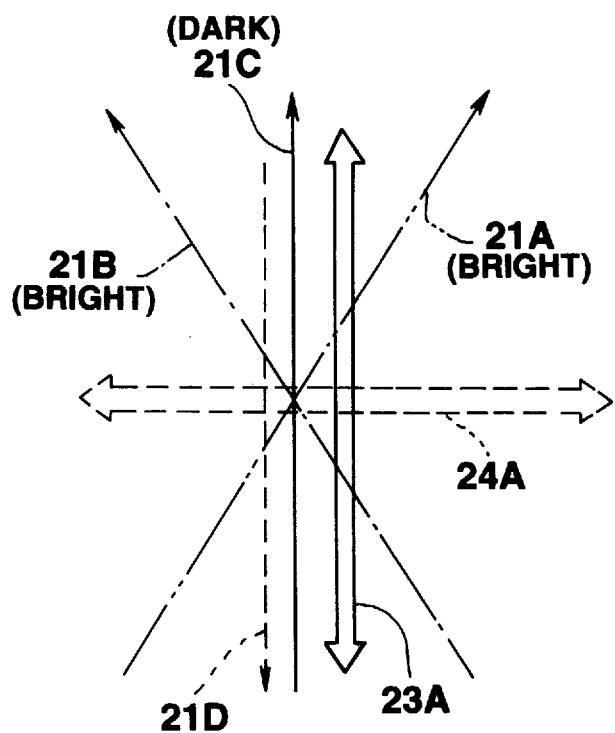
FIG. 4 is a plan view showing the relationship among the direction of the aligning treatment, the directions of the transmission axes of upper and lower polarization plates and the aligning direction of the LC molecules.

A pair of polarization plates 23 and 24 are arranged at the top and bottom of the LCD device. As shown in FIG. 4, a transmission axis, 23A, of the polarization plate 23 is set substantially parallel to the direction 21C of the aligning treatment and a transmission axis, 24A, of the polarization plate 24 is set perpendicular to the transmission axis 23A. The LCD device whose polarization plates 23 and 24 have their transmission axes 23A and 24A set as shown in FIG. 4 has the highest transmittance (brightest display) in the first or second alignment state where the director (average aligning direction of the LC molecules) of the liquid crystal 21 is set in the first or second aligning direction 21A or 21B. The transmittance becomes the lowest (darkest display) when the director is set in the intermediate direction 21C approximately parallel to the direction of the normal line of the layer having the smectic phase.

The director of the liquid crystal 21 continuously varies between the directions 21A and 21B in accordance with the polarity and the voltage value (absolute value) of the applied voltage. Therefore, the transmittance of the ferroelectric LCD device can vary continuously.

Figure 1A:
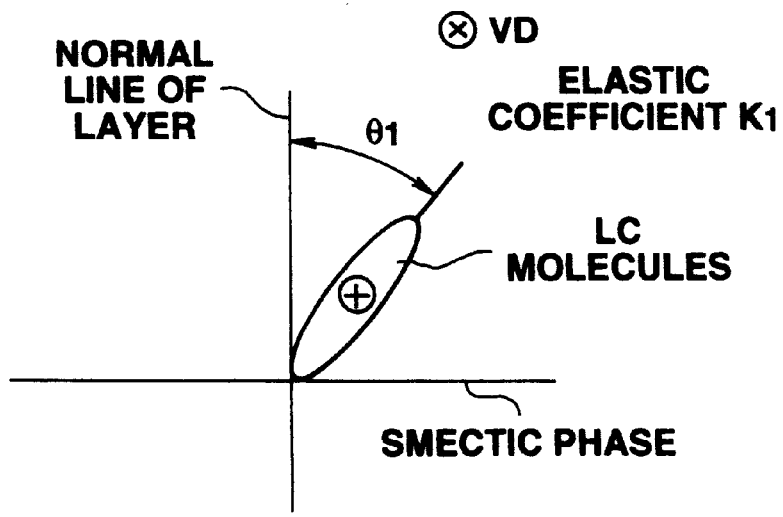
Figure 1B:
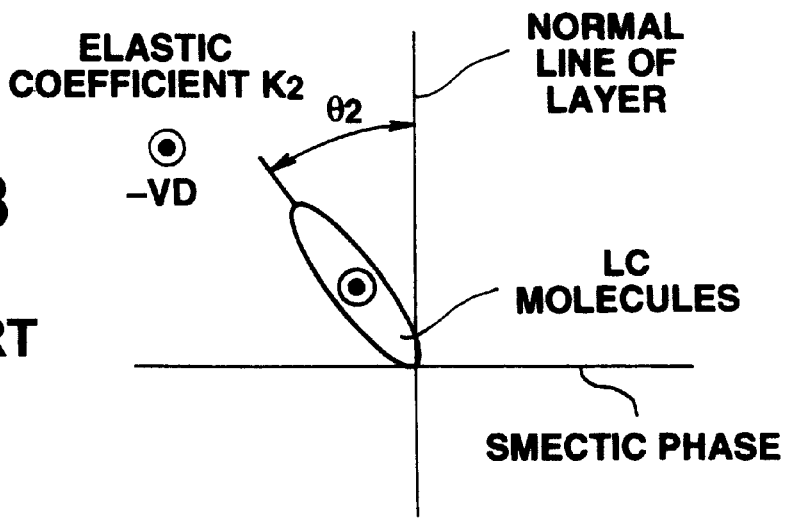

According to the LCD device which employs the above-described optical arrangement, if the angle (tilt angle) $\Theta_1$ of the LC molecules with respect to the direction of the normal line of the smectic layer of the LC molecules when a predetermined positive voltage shown in FIG. 1A is applied differs from the tilt angle $\Theta_2$ of the LC molecules when a predetermined negative voltage shown in FIG. 1B is applied, the transmittance when a positive voltage is applied differs from the transmittance when a negative voltage is applied. This deteriorates the display characteristics.

To overcome this shortcoming, rubbing is performed on the aligning film 18 once in each of the opposite directions 21C and 21D according to this embodiment. The elastic coefficient $K_R$ for the rightward tilting by the first rubbing and the elastic coefficient $K_R'$ for the leftward tilting by the second rubbing are averaged. The elastic coefficient $K_L$ for the leftward tilting by the first rubbing and the elastic coefficient $K_L'$ for the rightward tilting by the second rubbing are likewise averaged to become substantially the same. Consequently, the tilt angle $\Theta_1$ of the LC molecules when a predetermined positive voltage shown is applied becomes equal to the tilt angle $\Theta_2$ of the LC molecules when a predetermined negative voltage is applied. Therefore, the transmittances when voltages whose absolute values are the same are applied become equal to each other, regardless of the polarity of the applied voltage.

Figure 5:
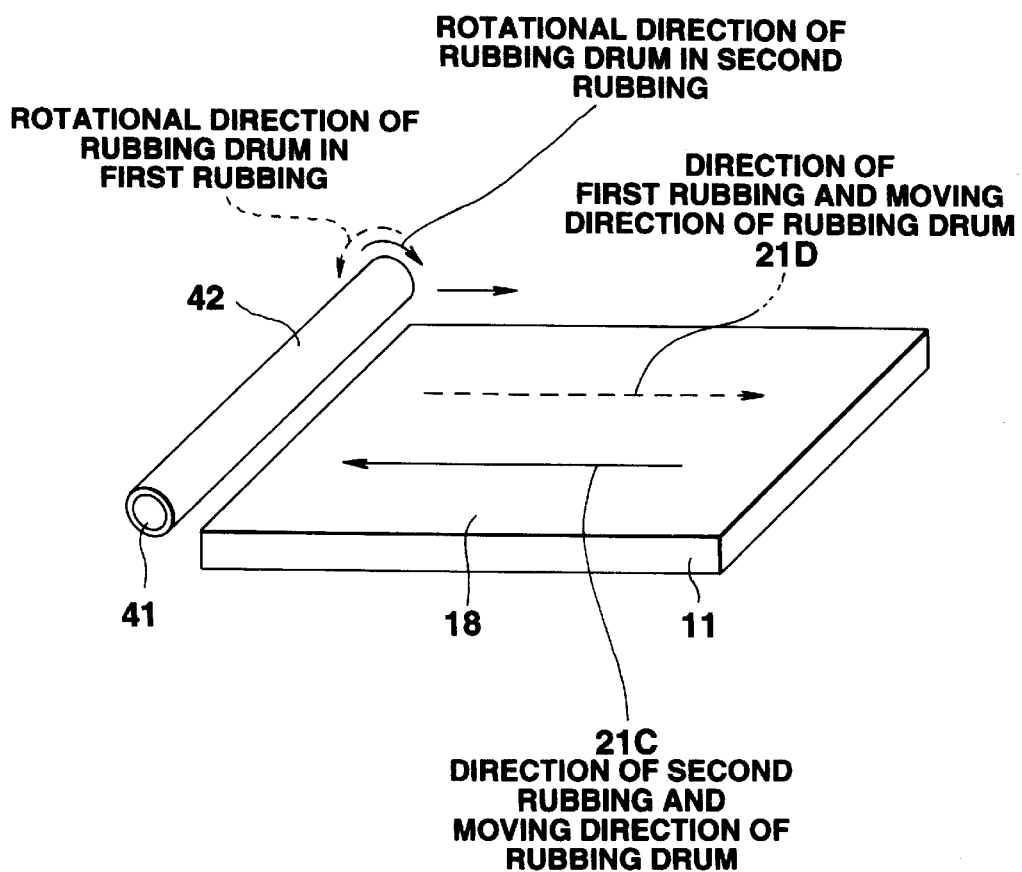
FIG. 5 is a diagram used for explaining how to rub an aligning film 18.

The aligning treatment on the aligning film 18 is accomplished by pressing the lower edge of a rubbing cloth 42, put around a rubbing drum 41 of a rubbing machine, against the aligning film 18 by about 0.55 mm and moving the rubbing drum 41 at a speed of 5 mm/sec while rotating the rubbing drum 41 at 500 rpm to effect rubbing in the first rubbing direction 21D, and subsequently moving the rubbing drum 41 in the opposite direction with the lower edge of the rubbing cloth 42 pressed against the aligning film 18 by about 0.45 mm to thereby effect rubbing in the second rubbing direction 21C, as shown in FIG. 5.

Figure 6:
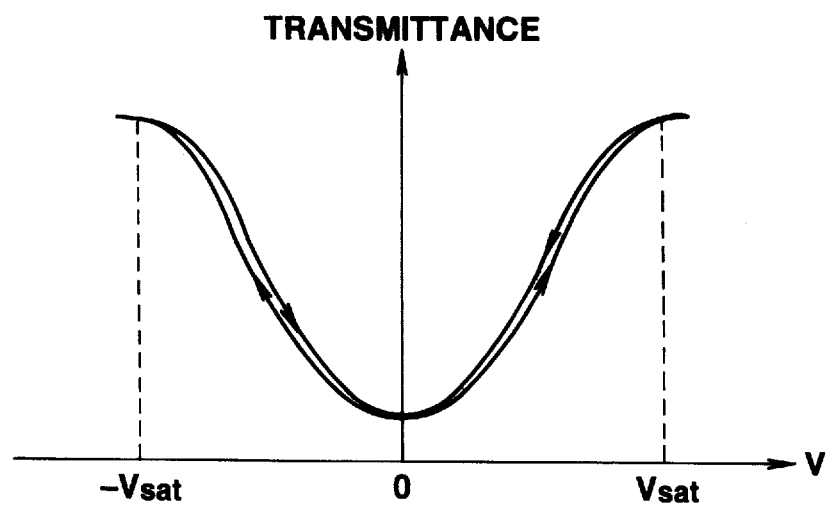
FIG. 6 is a graph showing the relationship between the applied voltage to the LCD device according to the first embodiment and the transmittance.

According to the LCD device with this structure, to stably display arbitrary gradations, it is desirable to use the liquid crystal whose optical response characteristic continuously changes as shown in FIG. 6 when a triangular-wave voltage having a relatively long period (about 0.1 Hz) is applied. It is desirable not to use the liquid crystal which has a specific threshold value in the optical response characteristic. It is also desirable that the hysteresis of the optical response characteristic be smaller.

The practical method of driving the thus constituted LCD device will now be described with reference to FIGS. 7A and 7B.

FIG. 7A shows the waveform of a gate signal which the row driver 31 applies to the gate line 15 connected to the first row of TFTs 14, and FIG. 7B shows the waveform of a data signal which the column driver 32 applies to the data line 16. For easier understanding, only the data signal for the first row of pixels is illustrated and the data signals for the other rows are not illustrated.

In FIGS. 7A and 7B, TF indicates one frame period, TS indicates the selection period of the first row of pixels, and TO indicates a non-selection period. Each selection period TS is about 60 μs, for example.

In this embodiment, as shown in FIG. 7B, drive pulses (write pulses) which have voltage values VD and −VD having the opposite polarities but the same absolute value are applied to the data line 6 in the selection periods TS for consecutive two frames TFodd (odd-numbered frame) and TFeven (even-numbered frame) in accordance with the display gradation. That is, two drive pulses, one positive and the other negative, whose voltage values have the same absolute value, are respectively applied to the selection periods TS for two frames TFodd and TFeven.

In this driving method, the write voltage VD is controlled within the range of V0 to $V_{max}$ where V0 is the minimum value of the write voltage VD and the maximum value $V_{max}$ is set slightly lower than the voltage (Vsat in FIG. 6) by which the saturation of the transmittance occurs.

When the ferroelectric LCD device is driven by the gate signal and data signal which have the above-described waveforms, the voltage VD or −VD of the drive pulse (write voltage) is applied to the pixel electrode 13 via the associated TFT 14, which is turned on by the gate signal, in the selection period TS for each row.

When the gate signal is disabled, resulting in the non-selection period TO, the TFTs 14 are turned off so that the voltage corresponding to the write voltage VD or −VD is held in the capacitor (pixel capacitor) formed by the pixel electrode 13, the opposing electrode 17 and the liquid crystal 21 provided therebetween. In the non-selection period TO, therefore, the transmittance of the pixel is kept at the value corresponding to the voltage retained by the pixel capacitor or the value corresponding to the write voltage VD or −VD.

In this embodiment, the liquid crystal in use has a transmittance which continuously changes with a change in applied voltage and the optical arrangement as illustrated in FIG. 4 is employed. Therefore, the transmittance with respect to the absolute value of the write voltage VD or −VD is determined specifically, so that clear gradation display can be accomplished by controlling the transmittance by adjusting the absolute value of the write voltage VD or −VD.

Moreover, rubbing is performed on the aligning film 18 twice in the opposite directions. Therefore, the tilt angle $\Theta_1$ of the LC molecules when the write voltage VD shown in FIG. 1A is applied becomes substantially equal to the tilt angle $\Theta_2$ of the LC molecules when the write voltage −VD shown in FIG. 1B is applied. It is thus possible to prevent the transmittance from varying depending on the polarity of the applied voltage, thus ensuring the desired display gradation irrespective of the polarity of the applied voltage.

An experiment was conducted to check the operation of the LCD device according to this embodiment.

Figure 8:
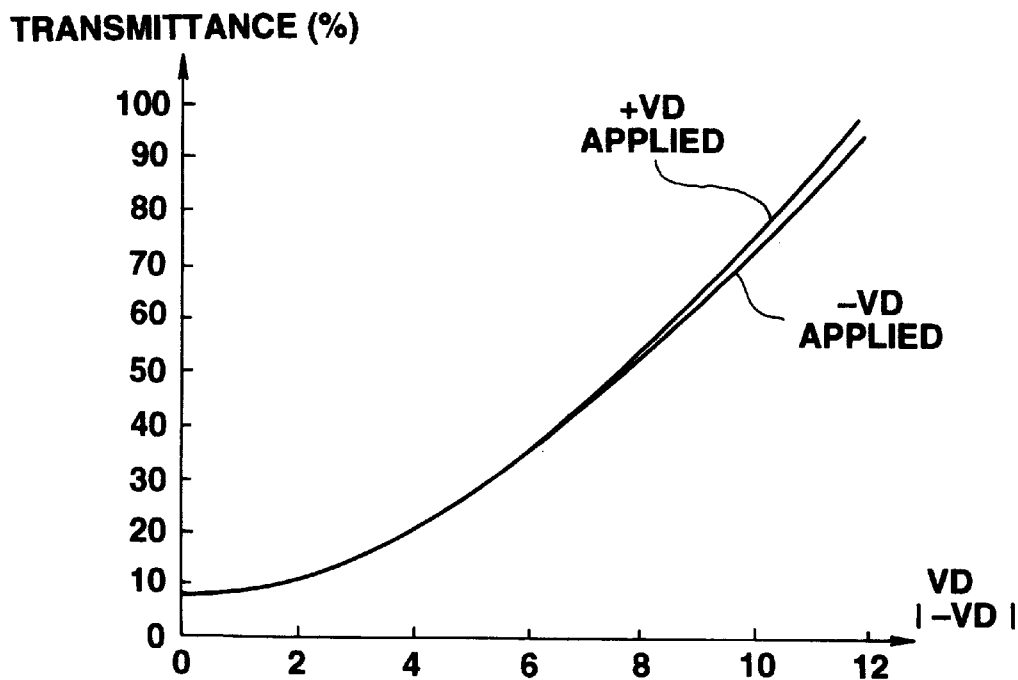
FIG. 8 is a graph showing a change in transmittance when the LCD device according to the first embodiment is driven using the drive waveforms shown in FIGS. 7A and 7B.
Figure 9:
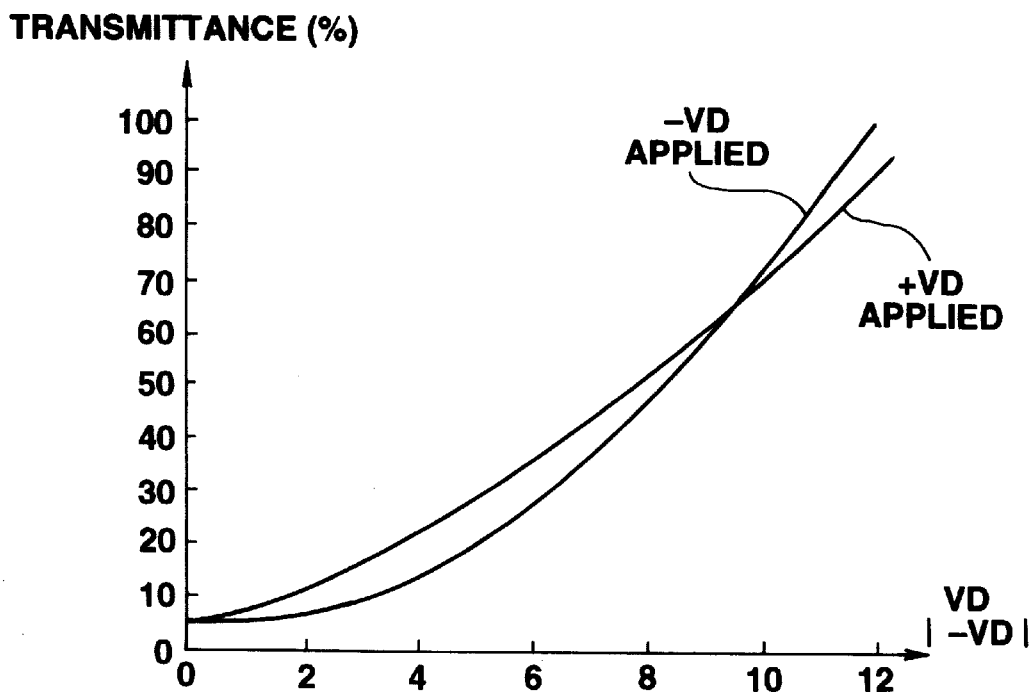
FIG. 9 is a graph showing a change in transmittance when an LCD device according to a Comparative Example is driven using the drive waveforms shown in FIGS. 7A and 7B.

FIG. 8 shows a change in the transmittance of the LCD device of this embodiment when this LCD device is driven by the driving method illustrated in FIGS. 7A and 7B and the voltage VD is changed as illustrated. FIG. 9 shows a change in the transmittance of an LCD device according to a Comparative Example whose aligning film 18 has undergone the aligning treatment once in the direction 21C.

According to the LCD device of this embodiment, as shown in FIG. 8, the transmittance with respect to the positive applied voltage VD hardly differs from the transmittance with respect to the negative applied voltage −VD. According to the LCD device of the Comparative Example shown in FIG. 9, by way of contrast, there is a significant difference between the transmittance with respect to the positive applied voltage VD and the transmittance with respect to the negative applied voltage −VD. The results of this experiment showed that this embodiment could provide an LCD device whose elastic energy between the aligning film and the LC molecules had a small anisotropy and which had excellent characteristics.

Although a DHF liquid crystal which is a ferroelectric liquid crystal is used as the liquid crystal 21 in the above-described embodiment, an SBF liquid crystal or an antiferroelectric liquid crystal (hereinafter referred to as "AFLC") which has two ferroelectric phases and one antiferroelectric phase may be used as well. The AFLC in use should have the transmittance which continuously varies with a change in applied voltage and which should not have a specific threshold value, as shown in FIGS. 10 through 13. This optical characteristic can be acquired by using the following four types of AFLCs either singly or in combination.

(1) The AFLC in which the double helixes drawn by the liquid crystal having a smectic CA* phase deform in accordance with the applied voltage.

(2) The AFLC in which the rotation of the LC molecules about the long axes is suppressed by the application of the voltage so that the LC molecules tilt in the direction perpendicular to the electric field.

(3) The AFLC whose LC molecules move along the cone by the angle according to the applied voltage.

(4) The AFLC whose LC molecules in one of two alignment states are changed to the other alignment state in accordance with the applied voltage with the ratio that changes in accordance with the applied voltage.

The AFLC having the characteristics (1) and (4) is obtained by, for example, mixing three liquid crystal materials having the following main structures (I) to (III).

R2, R3, R4: independent hydrogen groups, $C_1$–$C_{15}$ linear or branched alkyl groups, $C_2$–$C_{15}$ linear or branched alkenyl groups, or $C_7$–$C_{10}$ linear or branched aralkyl groups, X1: carboxyl group, ether group or single bond, X2: carboxyl group, ether group, methoxy group or single bond, X3: carboxyl group, methoxy group, ether group or single bond, X4: ether group, carboxyl group or single bond, A, B: independent groups having a 6-membered ring, which may be substituted, n: 0 or 1, R6: $C_1$–$C_{15}$ alkyl group or alkoxy group, which may have a substituent, R7: $C_1$–$C_{15}$ alkyl group which may have a substituent, Q: ether group, carboxyl group, urethane group or single bond, and E: benzene ring or pyrimidine ring.

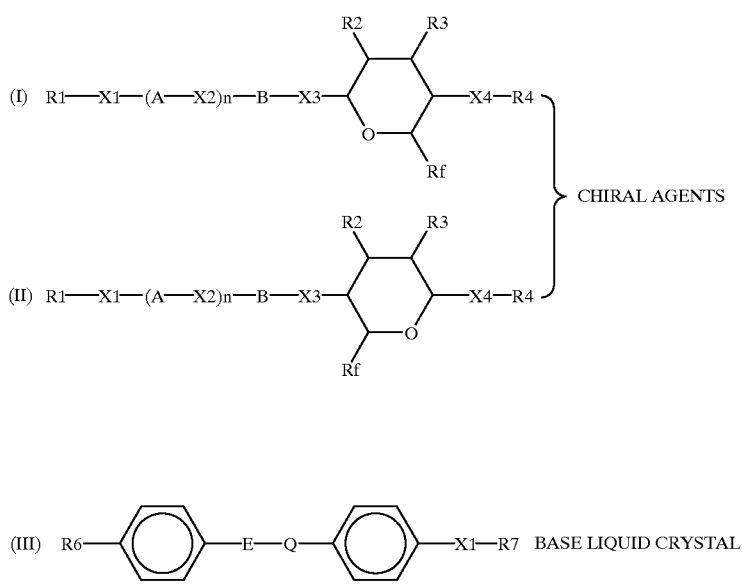

Rf: $C_1$ or $C_2$ fluoroalkyl group,

R1: $C_3$–$C_{20}$ linear or branched alkyl group,

The AFLC having the characteristic (3) is obtained by, for example, mixing two liquid crystal materials having the following main structures (IV) and (V).

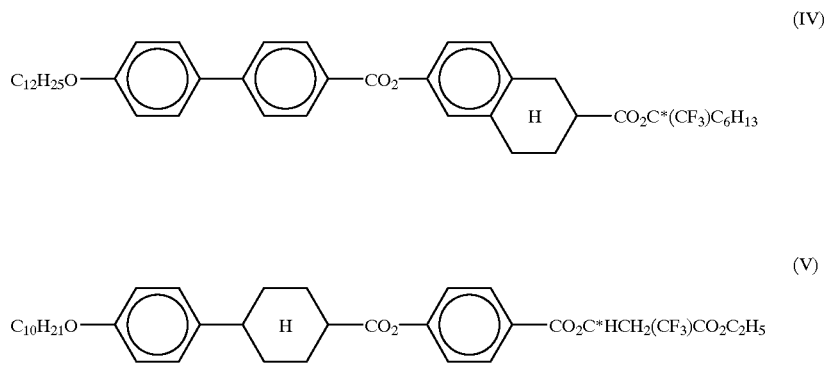

The AFLC having the characteristics (2) to (4) is obtained by, for example, mixing two liquid crystal materials having the following main structures (VI) and (VII).

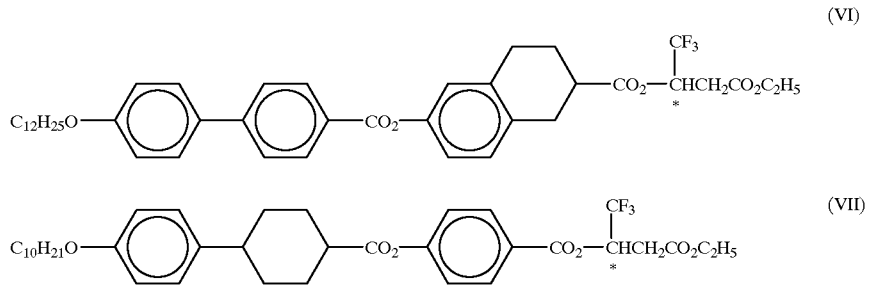

The AFLC having the characteristics (3) and (4) is obtained by, for example, mixing three liquid crystal materials having the following main structures (VIII) to (X).

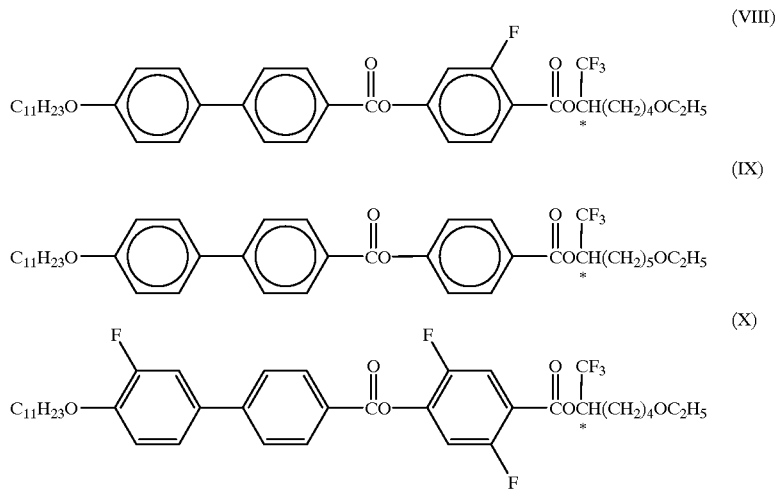

Although the aligning treatment (rubbing) is performed on the aligning film 18 twice in the above-described embodiment, the number of the rubbing processes may be set greater. It is however desirable that rubbing be executed in an even number of times in the opposite directions.

While the aligning treatment is performed only on the aligning film 18, it may be executed on the aligning film 19 too in which case it is also desirable to perform rubbing on the aligning film 19 in an even number of times in the opposite directions.

Although two drive pulses, one positive and the other negative, are applied to the liquid crystal 21 for each piece of display data according to the driving method illustrated in FIGS. 7A and 7B, a single drive pulse may be applied to each piece of display data. In the case where there are display data I1, I2, I3, I4 and so forth, for example, voltages VD1, −VD2, VD3, −VD4 and so forth may be applied respectively. In FIG. 4, the transmission axis 23A of one polarization plate 23 is set coincident to the intermediate direction 21C between the first aligning direction 21A and the second aligning direction 21B and the transmission axis 24A of the other polarization plate 24 is set perpendicular to the transmission axis 23A. The transmission axis 24A of the other polarization plate 24 may however be set parallel to the transmission axis 23A.

Further, the absorption axis of one polarization plate 23 may be set coincident to the intermediate direction 21C between the first aligning direction 21A and the second aligning direction 21B, and the absorption axis of the other polarization plate 24 may be set perpendicular to the absorption axis of the polarization plate 23.

Although the foregoing description of the first embodiment has been given of the LCD device which is of an active matrix type, this invention may likewise be adapted to an LCD device of a simple matrix type.

Second Embodiment

An LCD device according to the second embodiment will now be discussed.

The basic structure of this LCD device is the same as that of the LCD device of the first embodiment illustrated in FIGS. 2 through 4.

The liquid crystal 21 in this embodiment is an AFLC whose transmittance continuously varies with a change in applied voltage and which does not have a specific threshold value, as shown in FIGS. 10 through 13.

To begin with, a description will be given of the relationship between the pretilt angle given to the liquid crystal 21 by the aligning films 18 and 19 of the LCD device of this embodiment and the alignment of the liquid crystal 21. The "pretilt angle" in this specification is defined as the pretilt angle of a nematic liquid crystal which is arranged on the aligning films.

FIG. 14A shows the occurrence of an alignment defect with no voltage applied when the pretilt angle is large (equal to or greater than 10 degrees). FIG. 14B shows the occurrence of an alignment defect with no voltage applied when the pretilt angle is small (equal to or smaller than 1 degree). It is apparent from FIGS. 14A and 14B that with a high tilt angle, the alignment of the LC molecules is disturbed, thus forming multiple minute areas where light passes though no voltage is applied.

In FIG. 14B, the alignment is stable and black is displayed.

It should be understood from the above that it is desirable that the pretilt angle to be given to the liquid crystal by the aligning films be equal to or smaller than 1 degree, preferably 0.8 degree or smaller.

To reduce the pretilt angle, the aligning films 18 and 19 should be formed of materials which have a large surface energy (large polarity component of the surface energy). Alternatively, the aligning films 18 and 19 should be formed thinner so that the surfaces of the aligning films 18 and 19 are influenced by the high surface energy material (ITO or the like) which is the base material. If the aligning films 18 and 19 in use have large surface energies, however, the interaction between the aligning films 18 and 19 and the LC molecules becomes greater, which will raise a new problem of making it easier to cause alignment defects originated from such interaction.

Figure 15A:
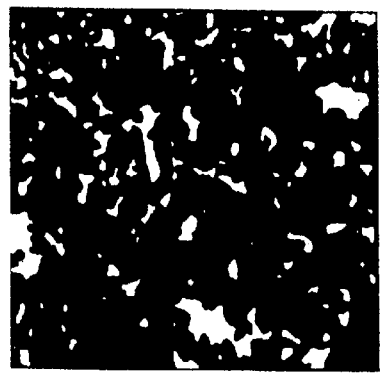
Figure 15B:

FIG. 15A shows the occurrence of an alignment defect when the aligning films 18 and 19 in use have high surface energies (8 dyne/cm) and the polarization plates 23 and 24 are set as illustrated in FIG. 4 with no voltage applied. FIG. 15B shows the occurrence of an alignment defect when the aligning films 18 and 19 in use have low surface energies (4 dyne/cm) and the polarization plates 23 and 24 are set as illustrated in FIG. 4 with no voltage applied.

In FIG. 15A, the alignment is disturbed so that multiple minute areas where light passes are formed though no voltage is applied and gray is displayed. In FIG. 15B, by way of contrast, the alignment is stable and black is displayed. It is to be understood from those diagrams that the surface energy should be suppressed.

To reduce the surface energies of the aligning films 18 and 19, the aligning films 18 and 19 are formed of materials which have a relatively small surface energy and their thicknesses are set equal to or greater than 10 nm to reduce the influence of the base film in the second embodiment. The surfaces of the aligning films 18 and 19 are rubbed in two directions as per the first embodiment. More specifically, as shown in FIG. 5, the aligning films 18 and 19 are rubbed in the direction 21D so as to acquire a pretilt angle of 5 degrees by moving the rubbing drum 41 around which the rubbing cloth 42 is put while rotating the rubbing drum 41, and are subsequently rubbed in the opposite direction 21C so as to acquire a pretilt angle of 6 degrees. This aligning treatment allows a pretilt angle of 1 degree to be acquired as in the case where the aligning treatment is performed in the direction 21C to provide a pretilt angle of 1 degree. Because aligning treatments for providing high pretilt angles are performed on both aligning films 18 and 19 in the second embodiment, the aligning films 18 and 19 maintain low surface energies.

Therefore, it is possible to ensure the uniform alignment state as shown in FIG. 14B with respect to the tilt angle, and to ensure the uniform alignment state as shown in FIG. 15B from the viewpoint of the surface energy. An LCD device with fewer alignment defects can thus be provided.

The first and second rubbing treatments are not limited to the rubbing to yield a pretilt angle of 5 degrees and the rubbing to yield a pretilt angle of 6 degrees. It is possible to perform rubbing in the first direction to yield an arbitrary pretilt angle of n degrees and perform rubbing in the direction opposite to the first direction to yield a pretilt angle of n degrees ± (1 degree or less).

The number of rubbing treatments is not limited to two times, but rubbing may be executed three or more times.

Third Embodiment

An LCD device according to the third embodiment will now be discussed.

The basic structure of this LCD device is the same as that of the LCD device of the first embodiment illustrated in FIGS. 2 through 4. The liquid crystal 21 in this embodiment, like the one in the second embodiment, is an AFLC which has the characteristics as shown in FIGS. 10 through 13.

It is to be noted that the aligning films 18 and 19 provided on the lower substrate 11 and the upper substrate 12 are made of an organic high molecular compound which contain polyimide as the essential substance. It is desirable that this organic high molecular compound should have a small bipolar moment. Rubbing in the direction 21C shown in FIG. 4 is performed on the surfaces of the aligning films 18 and 19. In this embodiment, no aligning treatment is performed in the opposite direction 21D. The aligning films 18 and 19 are formed to have thicknesses of 10 nm to 35 nm.

A description will now be given of the relationship between the thicknesses of the aligning films 18 and 19 of the thus constituted LCD device and the drive voltage to be applied between the pixel electrodes 13 and the opposing electrode 17.

Figure 16A:
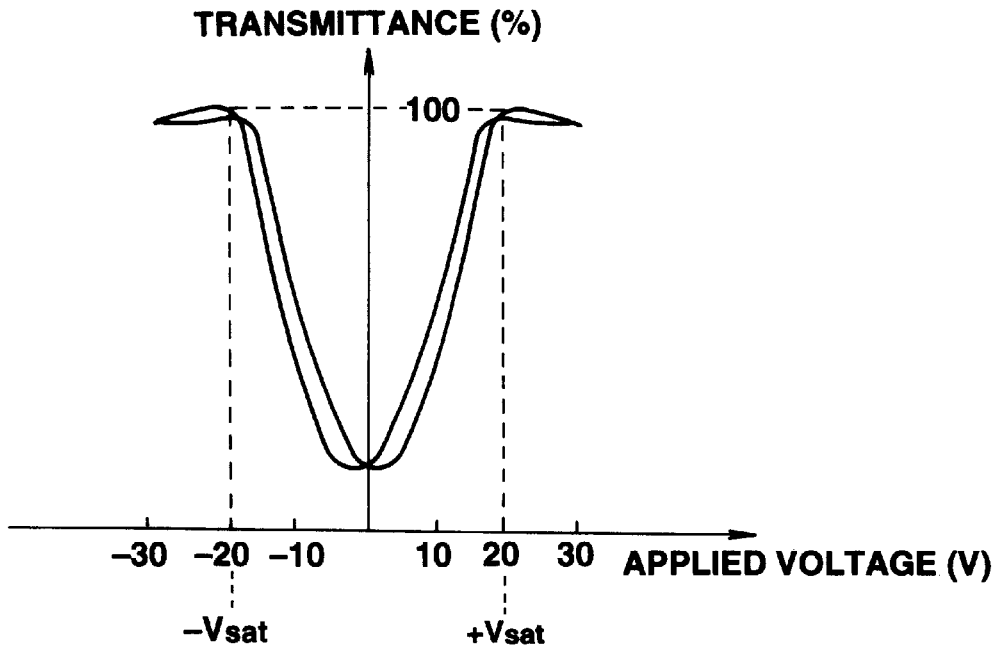
FIG. 16A is a graph illustrating the relationship between the applied voltage and the transmittance when the thickness of each aligning film is 60 nm.

FIG. 16A illustrates the relationship between the applied voltage and the transmittance when the thickness of the aligning films 18 and 19 are 60 nm and when a triangular-wave voltage having a relatively long period (about 0.1 Hz) is applied between the pixel electrodes 13 and the opposing electrode 17.

Figure 16B:
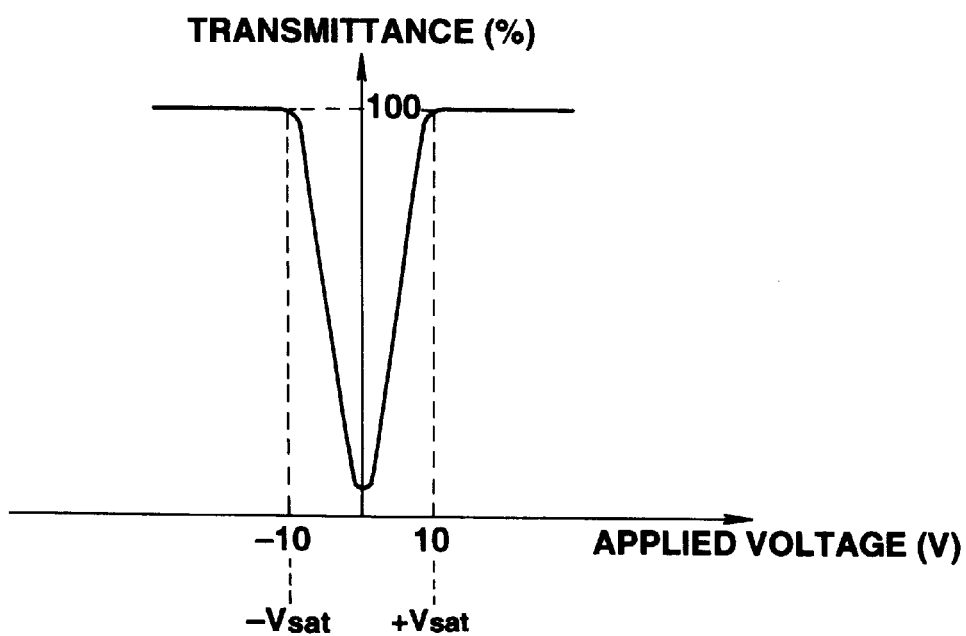
FIG. 16B is a graph illustrating the relationship between the applied voltage and the transmittance when the thickness of each aligning film is 30 nm.

FIG. 16B illustrates the relationship between the applied voltage and the transmittance when the thickness of the aligning films 18 and 19 are 30 nm and when a triangular-wave voltage having a relatively long period is applied.

Figure 10:
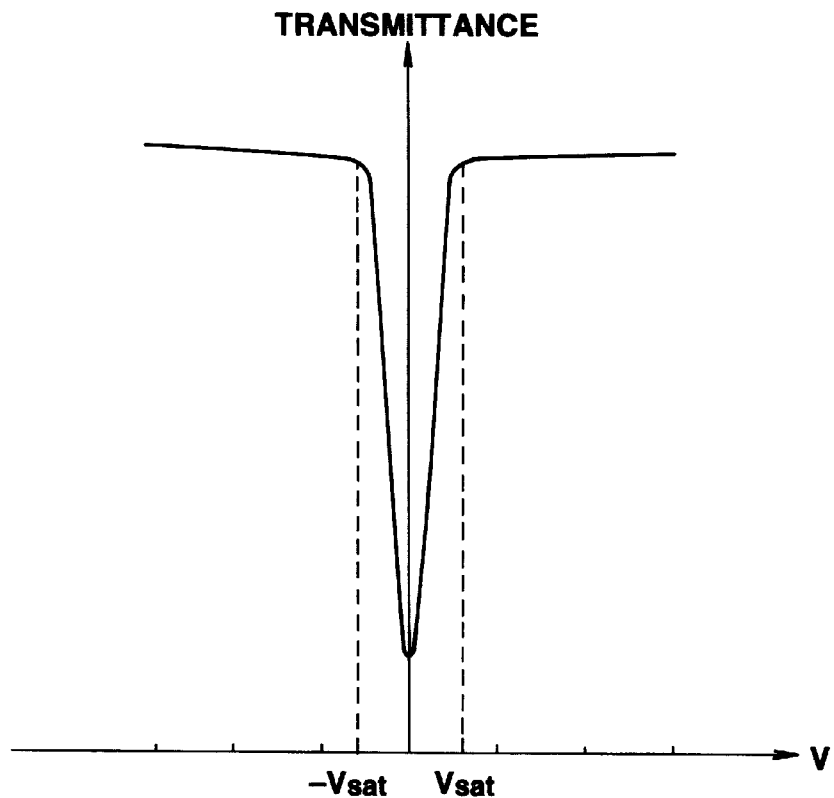
FIG. 10 is a graph showing the relationship between the applied voltage to an antiferroelectric liquid crystal which is usable in the first embodiment and the transmittance.
Figure 11:
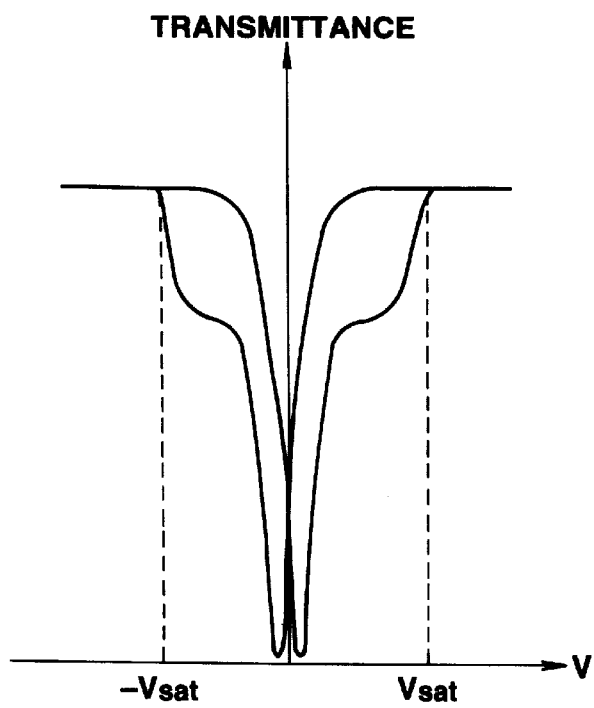
FIGS. 11 to 13 are graphs showing the relationships between the applied voltage to antiferroelectric liquid crystals which are usable in the first embodiment and the transmittance.
Figure 12:
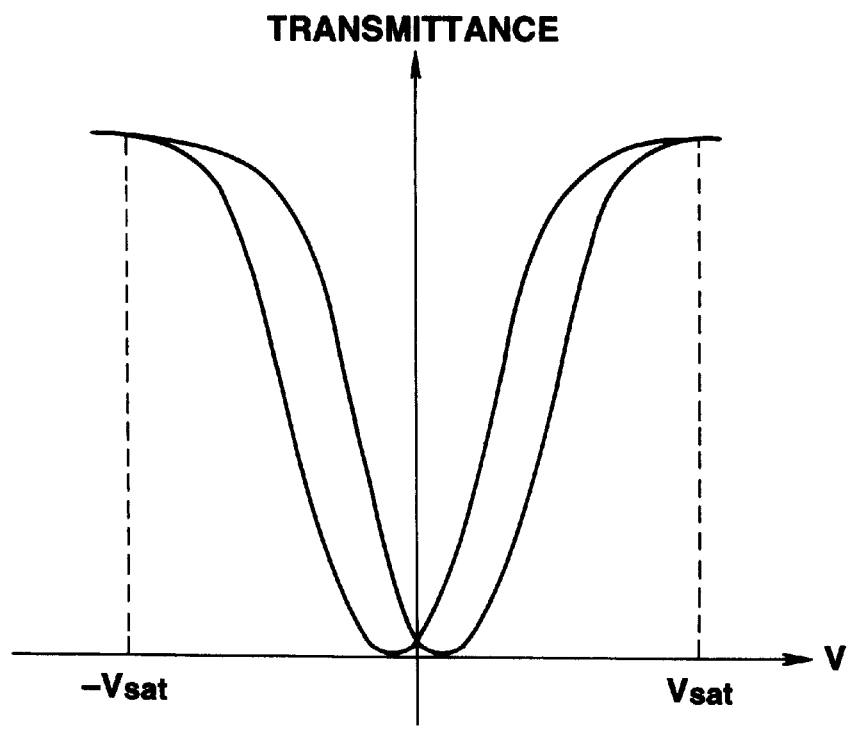
Figure 13:
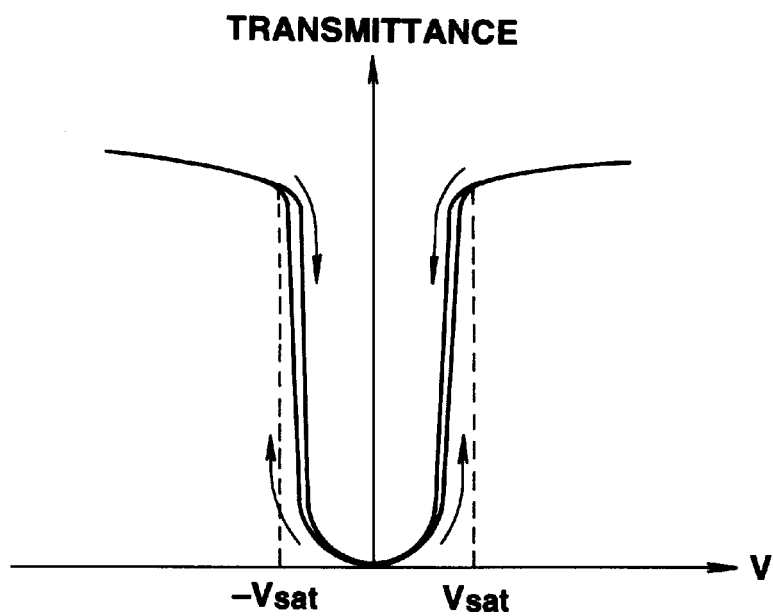

The level of the applied voltage (0 V to Vsat) for acquiring substantially the maximum transmittance is 20 V in FIG. 16A and 10 V in FIG. 16B. That is, the drive voltage can be reduced to about a half by making the aligning films 18 and 19 thinner to 30 nm from 60 nm. The layer thickness of the liquid crystal 21 is approximately 1.5 $\mu$m, and the reduction ratio of the drive voltage is significantly larger than the reduction ratio of the applied voltage which is expected by making the aligning films 18 and 19 thinner.

Figure 17:
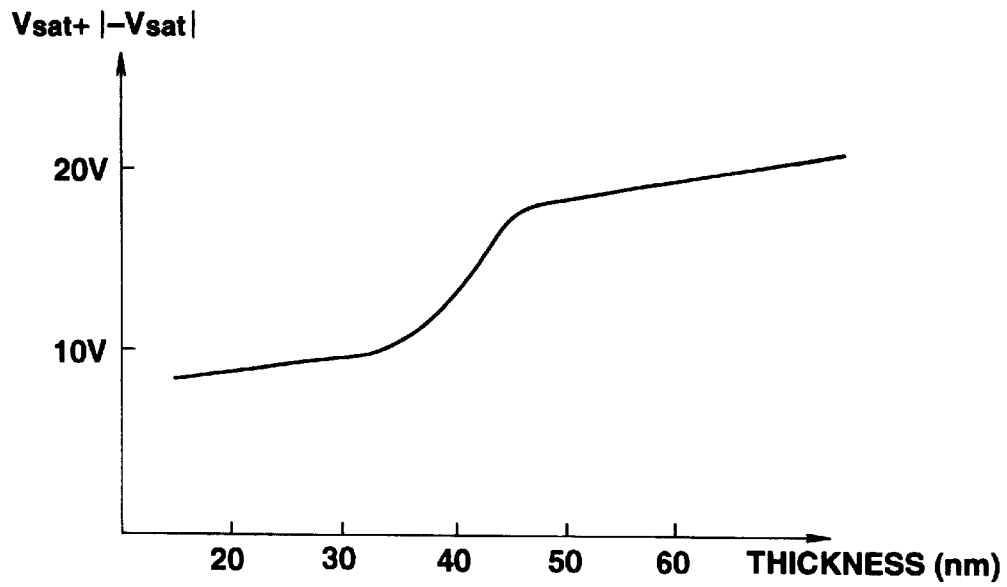
FIG. 17 is a graph illustrating the relationship between the thickness of the aligning film and the saturation voltage.

FIG. 17 shows the relationship between the thicknesses of the aligning films 18 and 19 and the drive voltage (Vsat+ |−Vsat|). As is apparent from this diagram, the drive voltage drastically varies in the area where the film thicknesses range from 40 nm to 50 nm. According to this embodiment, therefore, the thicknesses of the aligning films 18 and 19 are set equal to or smaller than 35 nm; for example, they are set to 30 nm.

When the aligning films 18 and 19 are made thinner, the apparent surface energy $\gamma$ of each of the aligning films 18 and 19 (polarity component of the surface energy) becomes higher due to the influence of the member underlying those aligning films 18 and 19, particularly, the material such as ITO which has a high surface energy. As the apparent surface energy increases, the interaction between the aligning films and LC molecules increases, disturbing the alignment of the LC molecules. As a result, the alignment defects are apt to occur. FIG. 15A shows the occurrence of an alignment defect when the surface energies of the aligning films are high (8 dyne/cm), and FIG. 15B shows the occurrence of an alignment defect when the surface energies of the aligning films are low (4 dyne/cm). In FIG. 15A, the alignment is disturbed so that multiple minute areas where light passes are formed though no voltage is applied. Therefore, gray is displayed. In FIG. 15B, by way of contrast, the alignment is stable and black is displayed.

To eliminate the influence of the surface energy of the underlying film to suppress the polarity component of the surface energy on each aligning film as much as possible, therefore, the thicknesses of the aligning films 18 and 19 are set equal to or greater than 10 nm in this invention.

For a color LCD device, it is desirable to set the thicknesses of the aligning films 18 and 19 equal to or greater than 10 nm in order to reduce the roughness of the surfaces of the aligning films caused by the undulation (surface roughness) of the color filter or the black mask.

According to the LCD device of this embodiment, as described above, the thicknesses of the aligning films 18 and 19 are set to a range of 10 nm to 35 nm, so that the LCD device can be driven by a low drive voltage. It is further possible to evenly align the liquid crystal to reduce alignment defects.

The liquid crystal 21 may be a ferroelectric liquid crystal (DHF liquid crystal, SBF liquid crystal or the like), nematic liquid crystal or the like.

Although the aligning films 18 and 19 are respectively provided on the substrates 11 and 12 in the structure shown in FIG. 2, an aligning film may be provided on only one of the substrates 11 and 12. The ferroelectric liquid crystal and antiferroelectric liquid crystal have layer structures with a smectic phase and the liquid crystal is aligned with the direction of the normal line of the LC layer set substantially coincident to the direction of the aligning treatment of the aligning film.

In this case, the thickness of the aligning film should be set to 10 nm to 70 nm. With the selection of this thickness, an LCD device which can operate on a low voltage and has fewer alignment defects can be provided as in the third embodiment.

Fourth Embodiment

Even when the aligning films 18 and 19 having the desired characteristics are formed in the first to third embodiments, if the aligning films 18 and 19 are exposed to a high temperature in the later stage of forming an LCD device, the characteristics are deteriorated. In this case, the completed LCD device does not have the desired characteristics.

The following will discuss an LCD device which can avoid such a problem and a method of manufacturing the same.

The basic structure of the LCD device according to this embodiment is the same as those of the LCD devices of the first to third embodiments, with the exception that the glass-transition point of polyimide which is the material for the aligning films 18 and 19 is equal to or higher than 250° C.

The seal member 10 and the sealing agent 26 are both made of thermosetting resins or the like, such as epoxy resins, and are hardened by baking at approximately 220° C.

According to this structure, the glass-transition point of the aligning films 18 and 19 is set equal to or higher than 250° C. and the deterioration of the aligning films (e.g., the movement or inclination of the principal chain of polyimide constituting the aligning films) does not occur even at the time of baking the seal member 20 and the sealing agent 26. It is therefore possible to reduce alignment defects and display high-quality images with less display defects.

The method of manufacturing the LCD device with the above-described structure will be discussed below.

First, a matrix of the TFTs 14 and pixel electrodes 13 is formed on the lower substrate 11.

Subsequently, for example, the resultant structure is coated with a polyamic acid solution or the like and is then subjected to a heat treatment to form the aligning film 18 of polyimide. This polyimide has a glass-transition point of 250° C. or higher. Then, an aligning treatment like rubbing is performed on the surface of the aligning film 18 as shown in FIG. 5. This completes the process on the side of the lower substrate 11.

The opposing electrode 17 of ITO is formed on the upper substrate 12. Then, like the aligning film 18, the aligning film 19 of polyimide is formed. The glass-transition point of the aligning film 19 is likewise equal to or higher than 250° C. An aligning treatment like rubbing is likewise performed on the surface of the aligning film 19 as needed.

Figure 18:
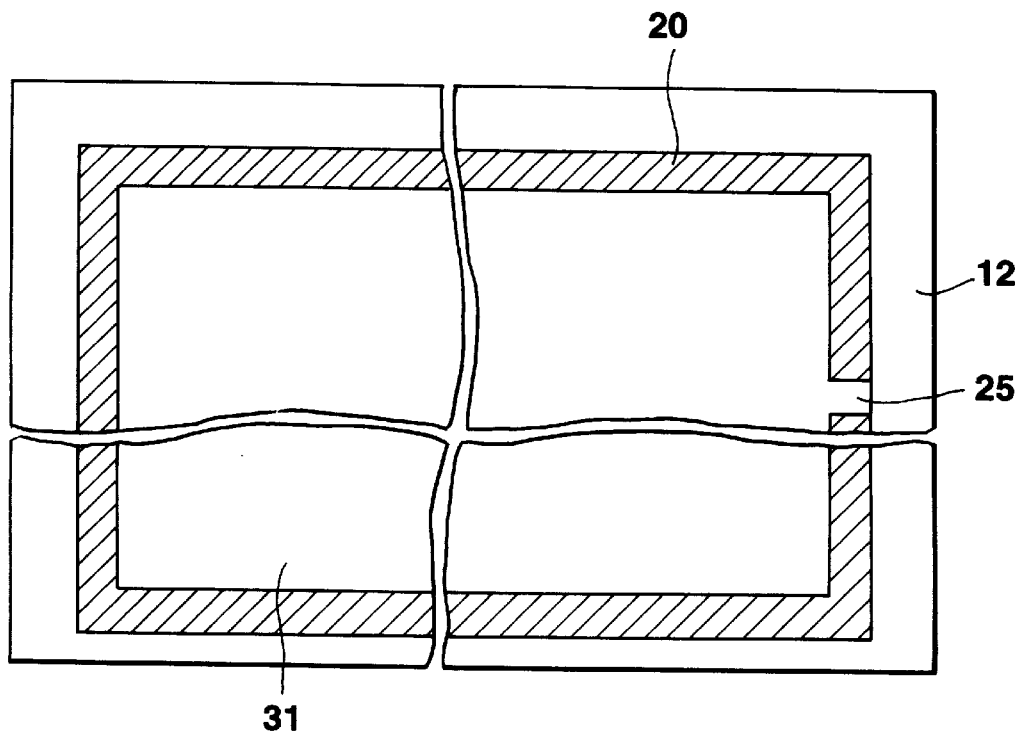
FIG. 18 is a plan view showing a seal member 20 coated on an upper substrate.

Subsequently, a spacer 22 is formed on the aligning film 18 and the seal member 20 made of a thermosetting epoxy resin or the like is coated in a frame shape at the edge portions of the upper substrate 12 as shown in FIG. 18 by screen printing or the like. The liquid crystal inlet 25 should previously be formed in the seal member 20.

Next, the lower substrate 11 and the upper substrate 12 are bonded and the resultant structure is prebaked after which the temperature of 220° C. is maintained for 15 minutes to bake and harden the seal member 20. Then, the liquid crystal 21 is injected from the liquid crystal inlet 25 using vacuum injection or the like. After this injection, the liquid crystal inlet 25 is sealed by the sealing agent 26 which is made of the same resin as the seal member 20, and the temperature of 200° C. is maintained for 10 minutes to harden the sealing agent 26. This completes the LC cell.

Then, the polarization plates 23 and 24 are arranged to complete the LCD device.

According to this structure, because the glass-transition points of the aligning films 18 and 19 are sufficient higher than the baking temperature, the aligning films 18 and 19 are not adversely affected at the time of baking the seal member 20 and the sealing agent 26. In other words, the principal chain of the high molecular resin constituting each aligning film 18 or 19 is not moved to shift the drawing axis. An LCD device with fewer alignment defects can thus be manufactured.

FIG. 19A shows the occurrence of an alignment defect with no voltage applied in the case where the aligning films 18 and 19 are formed of polyimide whose glass-transition point is 200° C. and the aligning treatment and the arrangement of the polarization plates are set as illustrated in FIG. 3.

FIG. 19B shows the occurrence of an alignment defect with no voltage applied in the case where the aligning films 18 and 19 are formed of polyimide whose glass-transition point is 250° C. and the aligning treatment and the arrangement of the polarization plates are set as illustrated in FIG. 4. It should however be noted that no aligning treatment is performed in the direction 21D.

It is also to be noted that the used liquid crystal is an antiferroelectric liquid crystal and the seal member was baked under such conditions that the prebaking was performed for five minutes at 90° C. and the main baking was conducted for one hour at 170° C.

It is apparent from FIGS. 19A and 19B that a lattice-shaped alignment defect occurred when the aligning films whose glass-transition points are 200° C. were used, whereas an alignment defect hardly occurred when the aligning films whose glass-transition points are 250° C. were used.

It can also be confirmed from FIGS. 19A and 19B that this embodiment can reduce the occurrence of alignment defects.

This embodiment is effective for the liquid crystal 21 having a layer structure, particularly for a ferroelectric liquid crystal and antiferroelectric liquid crystal which have a smectic phase. This embodiment can however be likewise adapted to the ordinary nematic liquid crystal or the like.

The baking temperatures of the seal member 20 and the sealing agent 26 are considered as the factors that determine the glass-transition points of the aligning films 18 and 19 in this embodiment. In the case where the process of manufacturing the LCD device includes other heating processes, however, it is desirable to consider their heating temperatures. If color filters are formed using a heat treatment, for example, the aligning films 18 and 19 should be formed of high molecular materials having higher glass-transition points than the heating temperature involved at the time of forming the color filters.

The baking temperatures of the seal member 20, the sealing agent 26, the color filters, etc. can arbitrarily be selected, as long as the glass-transition points of the aligning films 18 and 19 are selected to be higher than the baking temperatures.

Although the liquid crystal 21 is filled in the LC cell using vacuum injection, another method may also be used. For example, the liquid crystal 21 may be filled in the LC cell using a dispenser or the like.

This invention is not limited to the first to fourth embodiments, and may be modified and adapted in various other forms. The first to fourth embodiments may be effected singly or in combination. For example, the aligning films 18 and 19 with thicknesses of 10 nm to 35 nm may be formed on the respective substrates 11 and 12 at the baking temperature of 250° C., and the aligning treatment may be performed twice on both aligning films 18 and 19 to yield a pretilt angle of 1 degree or smaller.

What is claimed is:

1. A liquid crystal display device comprising:
a first substrate on which a first electrode is formed;
a second substrate on which a second electrode facing said first electrode is formed;
a liquid crystal, located between said first and second substrates and having a layer structure with a smectic phase, said liquid crystal having first molecules aligned in a first oblique direction with respect to a direction of a normal line of said smectic layer and second molecules aligned in a second oblique direction with respect to a direction of a normal line of said smectic layer and said liquid crystal having an intermediate state in which an average direction of directors of said liquid crystal molecules is aligned in an arbitrary direction between said first oblique direction and said second oblique direction;
an aligning film, formed on said first substrate and said first electrode, for giving a pretilt angle of 1 degree or smaller to said liquid crystal, and for giving a substantially same elastic coefficient to liquid crystal molecules which tilt rightward with respect to a normal line of a layer of said layer structure of said liquid crystal and liquid crystal molecules which tilt leftward with respect to said normal line and giving a substantially same tilt angle to said liquid crystal molecules when voltages of a same value but of opposite polarities are applied to said liquid crystal; and
first and second polarization plates, so arranged as to sandwich said first and second substrates, said first polarization plate having an optical axis set in a direction substantially parallel to said normal line of said layer of said layer structure of said liquid crystal, said second polarization plate having an optical axis set perpendicular or parallel to said optical axis of said first polarization plate.

2. The liquid crystal display device according to claim 1, wherein said aligning film undergoes a first aligning treatment in a first direction substantially parallel to a normal line of a layer of said layer structure having said smectic phase and subsequently undergoes a second aligning treatment in a second direction opposite to said first direction.

3. The liquid crystal display device according to claim 2, further comprising a second aligning film which is formed on said second electrode.

4. The liquid crystal display device according to claim 1, wherein an aligning treatment is performed on said aligning film an even number of times alternately in opposite directions.

5. A liquid crystal display device comprising:
a first substrate on which a first electrode is formed;
a second substrate on which a second electrode facing said first electrode is formed;
an aligning film, formed on at least one of opposing surfaces of said first substrate and said second substrate and having a thickness within a range of 30 nm to 60 nm; and
a liquid crystal sealed between said first and second substrates and having a smectic phase having two ferroelectric phases and an intermediate state in which an average direction of directors of liquid crystal molecules of said liquid crystal is aligned in an arbitrary direction between two aligning directions of directors of said liquid crystal molecules aligned in said two ferroelectric phases;
wherein an aligning treatment is performed on said aligning film an even number of times alternately in opposite directions, for giving a pretilt angle of 1 degree or less to said liquid crystal.

6. The liquid crystal display device according to claim 5, wherein said liquid crystal comprises a liquid crystal having a ferroelectric phase and an antiferroelectric phase.

7. The liquid crystal display device according to claim 5, wherein said aligning film is formed on each of opposing surfaces of said first substrate and said second substrate, with a thickness of 30nm to 35 nm or less.

8. The liquid crystal display device according to claim 7, wherein said liquid crystal comprises an antiferroelectric liquid crystal having a ferroelectric phase and an antiferroelectric phase.

9. The liquid crystal display device according to claim 5, wherein said liquid crystal comprises a seal member formed between said first and second substrates by baking, and said aligning film has a glass-transition temperature higher than a baking temperature of said seal member.

10. The liquid crystal display device according to claim 9, wherein said seal member has an opening for injection of liquid crystal molecules, said opening being sealed by said seal member formed by baking at a temperature lower than said glass-transition temperature.

* * * * *